United States Patent
Pfautz et al.

(10) Patent No.: US 9,338,101 B2
(45) Date of Patent: May 10, 2016

(54) ADVERTISING NETWORK LAYER REACHABILITY INFORMATION SPECIFYING A QUALITY OF SERVICE FOR AN IDENTIFIED NETWORK FLOW

(71) Applicant: AT&T Intellectual Property I, L.P., Atlanta, GA (US)

(72) Inventors: Penn L. Pfautz, Middleton, NJ (US); Huajin Jeng, Middleton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 12 days.

(21) Appl. No.: 13/707,089

(22) Filed: Dec. 6, 2012

(65) Prior Publication Data

US 2014/0160924 A1    Jun. 12, 2014

(51) Int. Cl.
*H04L 1/00* (2006.01)
*H04L 12/851* (2013.01)

(52) U.S. Cl.
CPC ........ *H04L 47/2441* (2013.01); *H04L 47/2433* (2013.01)

(58) Field of Classification Search
CPC ..... H04L 45/302; H04L 45/04; H04L 45/306; H04L 45/54; H04L 47/724; H04L 47/14; H04L 47/17; H04L 47/20; H04L 47/2408; H04L 47/2425; H04L 47/786; H04L 47/805; H04L 47/824; H04L 47/829; H04L 12/18; H04L 12/2602; H04L 12/5695; H04L 12/66; H04L 41/0883; H04L 41/0889; H04L 41/0896; H04L 41/5003; H04L 41/5009; H04L 41/5022
See application file for complete search history.

(56) References Cited

U.S. PATENT DOCUMENTS

| | | | |
|---|---|---|---|
| 6,693,912 B1* | 2/2004 | Wang | 370/401 |
| 7,564,787 B2 | 7/2009 | Briggs | |
| 7,773,596 B1* | 8/2010 | Marques | 370/392 |
| 7,962,602 B1* | 6/2011 | Peterson et al. | 709/223 |
| 8,005,090 B2* | 8/2011 | Nakamichi et al. | 370/395.21 |
| 2010/0202312 A1* | 8/2010 | Eswaran | 370/252 |
| 2011/0268119 A1* | 11/2011 | Pong et al. | 370/392 |

(Continued)

OTHER PUBLICATIONS

"Multiprotocol Extensions for BGP-4," T. Bates, Y. Rekhter, R. Chandra, D. Katz; Network Working Group; Jun. 2000.*
Braden et al., "Resource ReSerVation Protocol (RSVP)—Version 1 Functional Specification," Request for Comments: 2205, Network Working Group, Sep. 1997 (113 pages).

(Continued)

*Primary Examiner* — Marsha D Banks Harold
*Assistant Examiner* — Elton Williams
(74) *Attorney, Agent, or Firm* — Hanley, Flight & Zimmerman, LLC

(57) ABSTRACT

Methods, apparatus and articles of manufacture for advertising network layer reachability information specifying a quality of service for an identified network flow are disclosed. Example methods disclosed herein to specify quality of service for network flows include receiving network layer reachability information including a first quality of service class specified for a first network flow, the network layer reachability information having been advertised by a first network element that is to receive the first network flow. Such example methods can also include updating an incoming packet determined to belong to the first network flow to indicate that the incoming packet belongs to the first quality of service class, the incoming packet being received from a second network element. Such example methods can further include, after updating the incoming packet, routing the incoming packet towards the first network element.

18 Claims, 11 Drawing Sheets

(56) References Cited

U.S. PATENT DOCUMENTS

2012/0218924 A1 8/2012 Bhalla
2013/0117449 A1* 5/2013 Hares et al. .................. 709/225

OTHER PUBLICATIONS

Cisco Systems, Inc., "Quality of Service for Multi-Protocol Label Switching Networks Q&A," 2001 (10 pages).
Knoll, Thomas Martin, "BGP Extended Community for QoS Marking," Internet-Draft, Inter-Domain Routing Working Group, Chemnitz University of Technology, Jul. 9, 2012 (18 pages).
Marques et al., "Dissemination of Flow Specification Rules," Request for Comments: 5575, Network Working Group, Aug. 2009 (23 pages).
Wikipedia, "Differentiated services," http://en.wikipedia.org/wiki/Differentiated_services, retrieved from the internet on Nov. 26, 2012 (8 pages).
Xiao et al., "Advertising Inter-domain QoS Routing Information," IEEE Journal on Selected Areas in Communications vol. 22, No. 10, Dec. 2004 (15 pages).
Xiao et al., "QoS Extension to BGP," 10th IEEE International Conference on Network Protocols, Nov. 12-15, 2002 (10 pages).

* cited by examiner

ADVERTISING NETWORK LAYER REACHABILITY INFORMATION SPECIFYING A QUALITY OF SERVICE FOR AN IDENTIFIED NETWORK FLOW

FIELD OF THE DISCLOSURE

This disclosure relates generally to networking and, more particularly, to advertising network layer reachability information specifying a quality of service for an identified network flow.

BACKGROUND

In modern communication networks, circuit switched trunks are still relied upon to exchange voice traffic between telecommunication service providers. However, given the prevalence of voice over Internet protocol (VoIP) services being offered by these same service providers, it is expected that Internet protocol (IP) peering connections will replace these circuit switched trunks for exchanging voice traffic between service providers. However, today's IP peering connections between service providers are generally limited to supporting a best-effort quality of service (QoS), which may become inadequate for VoIP services as the amount of voice traffic exchanged over these IP connections increases. As an alternative, direct connections supporting a higher QoS could be established between service providers for the purpose of exchanging voice traffic. However, some service providers may lack the infrastructure to implement such direct connections, or be unwilling to commit resources to implementing these direct connections given that voice traffic may account for just a small fraction of the provider's overall traffic and, thus, the provider's overall revenue.

BRIEF DESCRIPTION OF THE DRAWINGS

Wherever possible, the same reference numbers will be used throughout the drawing(s) and accompanying written description to refer to the same or like parts, elements, operations, etc.

DETAILED DESCRIPTION

Figure 1:
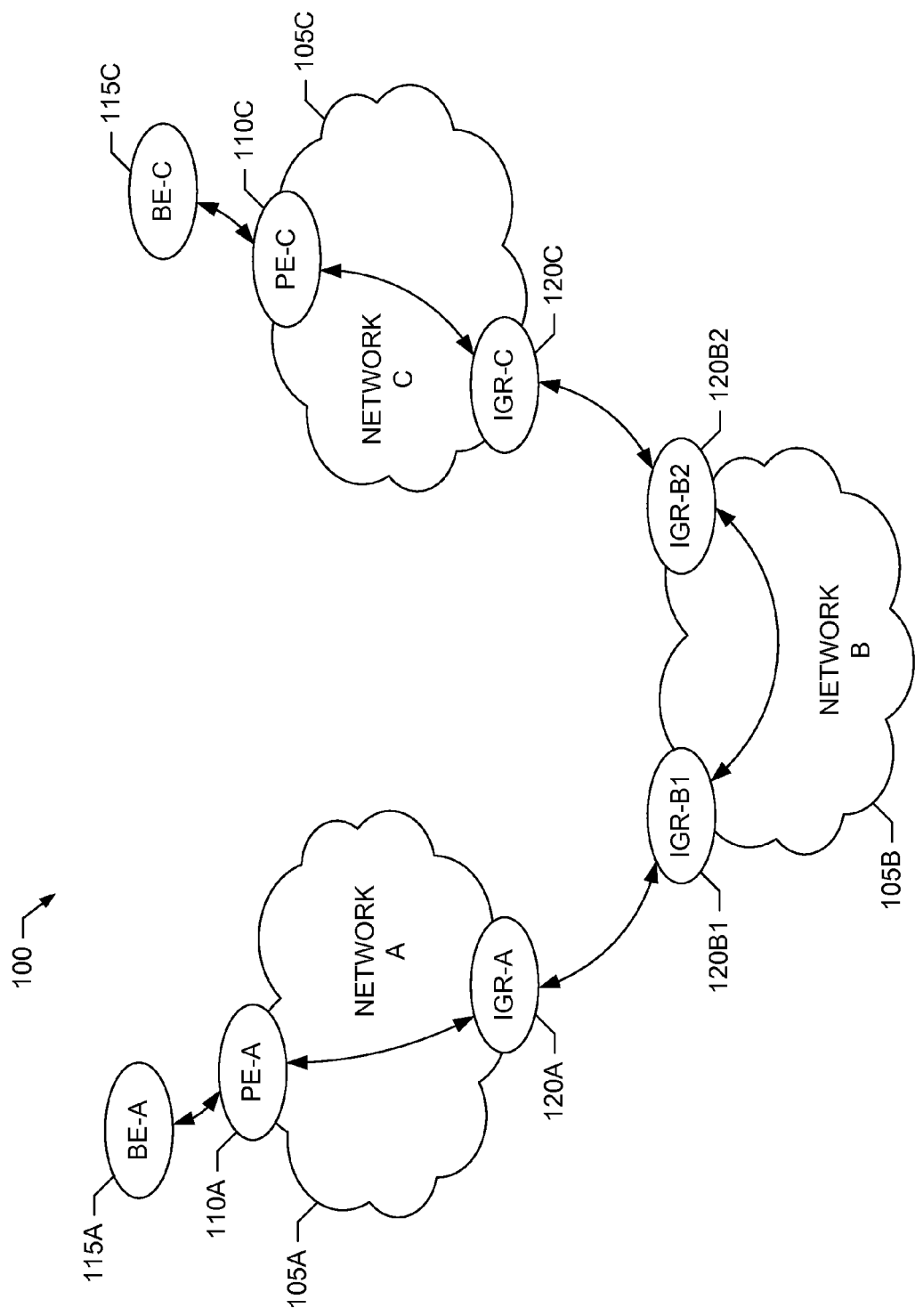
FIG. 1 is a block diagram of an example communication network supporting advertising of network layer reachability information specifying QoS for identified network flows as disclosed herein.

Methods, apparatus and articles of manufacture (e.g., storage media) for advertising network layer reachability information specifying a QoS for an identified network flow are disclosed herein. Example methods disclosed herein to specify QoS for network flows include receiving network layer reachability information including a first QoS class specified for a first network flow. The network layer reachability information, in such examples, is advertised by a first network element that is to receive the first network flow. Such example methods also include, updating an incoming packet determined to belong to the first network flow to indicate that the incoming packet belongs to the first QoS class, the incoming packet being received from a second network element. Such example methods further include, after updating the incoming packet, routing the incoming packet towards the first network element.

In some examples, the network layer reachability information can be received in a border gateway protocol update message. Additionally or alternatively, in some examples, the network layer reachability information further includes a destination prefix and a protocol type to identify the first network flow. In such examples, the destination prefix represents a network address that is reachable from the first network element. For example, the first network element may correspond to a first provider edge router, and the network address represented by the destination prefix may be associated with a first network border element that is reachable via the first provider edge router and servicing a first group of network endpoints that is to receive the first network flow. In some such examples, the first QoS class is specified for the first network flow when the first network border element is homed to the first provider edge router.

In some example methods, updating the incoming packet to indicate that the incoming packet belongs to the first QoS class involves changing bits in the incoming packet to match a first value representing the first QoS class. For example, if the first network element belongs to a first autonomous network, the second network element belongs to a second autonomous network, and the incoming packet is received from the second network element at a third network element belonging to a third autonomous network, then the first value may represent the first QoS class in the third autonomous network. Furthermore, in some examples, this first value may be different from respective values representing the first QoS class in the first and second autonomous networks.

These and other example methods, apparatus, systems and articles of manufacture (e.g., physical storage media) to implement and utilize advertising of network layer reachability information specifying a QoS for an identified network flow are disclosed in greater detail below.

As noted above, existing IP peering connections between service providers are generally limited to supporting a best-effort QoS, which may be inadequate for the VoIP traffic expected to be supported in the future. Using direct connections between service providers to meet a desired QoS may be an undesirable alternative to the existing, best effort IP peering connections. Although there are existing techniques for providing higher QoS over IP peering connections, such techniques have drawbacks that may deter implementation in a large-scale communication network including multiple telecommunication providers.

For example, one such existing QoS technique is based on the resource reservation protocol (RSVP), which is specified in the Internet Engineering Task Force (IETF) Request for Comments (RFC) document RFC 2205. RSVP takes the approach of reserving resources for separate flows in a routing path, and relies on RSVP-enabled routers that can examine packet headers and maintain a reservation state for each flow. As such, RSVP can consume significant network resources as the number of flows utilizing RSVP increases, thereby limiting the ability of RSVP to scale to support the amount of VoIP traffic flows expected in the future.

Another existing QoS technique is based on the differentiated services (DiffServ) approach for providing QoS over IP connections. Unlike RSVP, DiffServ does not reserve resources but, instead, uses a DiffServ Code Point (DSCP) to indicate packet priority and determine per-hop forwarding behavior. For IP connections, the DSCP is implemented by the type of service (TOS) bit field in IP version 4 (IPV4) packets, or the Traffic Class bit field in IPV6 packets. Use of DiffServ to provide a specified QoS involves proper marking of the DSCP bits at the origination network node, and also ensuring that these markings are honored (and possibly translated) across network boundaries. As such, DiffServ may require the use of separate negotiation signaling between Internet service providers (ISPs) to establish QoS marking agreements and packet remarking procedures. As such, DiffServ is a static approach for providing QoS and, thus, like RSVP, may have limited ability to scale to support the amount of VoIP traffic flows expected in the future. Moreover, DiffServ may lack flexibility and robustness to adapt to network re-provisioning changes, network failures, etc.

Unlike the static and inflexible treatment of QoS by RSVP and DiffServ, advertising network layer reachability information specifying quality of service for an identified network flow as disclosed herein can achieve real-time, scalable and flexible QoS treatment of traffic over IP peering connections between service providers. For example, and as described in greater detail below, network layer reachability information (NLRI) including a flow specification (flowspec) for an identified network flow is augmented to include a QoS class specified for the identified network flow. Such flowspec NLRI routing data, which includes the QoS class specification, is advertised from a downstream router that is to receive the network flow to upstream router(s) that propagate the flowspec NLRI routing data including the QoS class information.

The upstream routers use the received flowspec NLRI routing data to construct packet filters for filtering received network packets, thereby enabling the packets to be routed according to their respective QoS classes as specified in the received flowspec NLRI routing data. Using flowspec NLRI routing data to advertise QoS classes for identified network flow also enables the QoS class information for a particular network flow to be updated in real-time via a routing update, such as via a border gateway protocol (BGP) UPDATE message. As such, the QoS for a particular network flow can be changed in real-time without involving separate QoS negotiation signaling between ISPs. Accordingly, advertising network layer reachability information specifying quality of service for an identified network flow as disclosed herein is a scalable and flexible approach for QoS treatment of VoIP traffic over IP peering connections between service providers.

Turning to the figures, a block diagram of an example communication network 100 supporting advertising of network layer reachability information specifying QoS for identified network flows as disclosed herein is illustrated in FIG. 1. The communication network 100 of the illustrated example includes three (3) example autonomous networks 105A-C, some or all of which may correspond to different service providers or the same service provider. In the illustrated example of FIG. 1, the autonomous networks 105A-C support the routing of IP traffic, which may include signaling traffic, such as session initiation protocol (SIP) traffic, and media traffic, such as real-time transport protocol (RTP) traffic. For example, the RTP traffic may include VoIP traffic for voice calls carried by the autonomous networks 105A-C.

The autonomous network 105A of the example communication network 100 includes one or more edge routers to interconnect with one or more customer network(s) and/or other network(s) external to the autonomous network 105A. The edge router(s) of the autonomous network 105A can be implemented by any type(s) and/or number of network elements, such as an example provider edge (PE) router 110A as illustrated in the example of FIG. 1, and/or any other type(s) and/or number of network elements, such as one or more routers, gateways, bridges, servers, etc. For example, in the communication network 100 of FIG. 1, the PE router 110A interconnects with or, more generally, is in communication with, an example border element 115A that provides access to one or more groups of network addresses corresponding to one or more customer endpoints that are reachable via the border element 115A. The border element 115A can be implemented by any type(s) and/or number or network elements, such as one or more customer edge (CE) routers, session border controllers (SBCs), gateways, bridges (e.g., that have layer-3 routing capabilities), servers, etc.

Similarly, the autonomous network 105C of the example communication network 100 includes one or more edge routers to interconnect with one or more customer network(s) and/or other network(s) external to the autonomous network 105C. Like the edge router(s) of the autonomous network 105A, the edge router(s) of the autonomous network 105C can be implemented by any type(s) and/or number of network elements, such as an example PE router 110C as illustrated in the example of FIG. 1, and/or any other type(s) and/or number of network elements, such as one or more routers, gateways, bridges, servers, etc. For example, in the communication network 100 of FIG. 1, the PE router 110C interconnects with or, more generally, is in communication with, an example border element 115C that provides access to one or more groups of network addresses corresponding to one or more customer endpoints that are reachable via the border element 115C. Like the border element 115A, the border element 115C can be implemented by any type(s) and/or number or network elements, such as one or more customer edge (CE) routers, session border controllers (SBCs), gateways, bridges, servers, etc.

The autonomous networks 105A-C of the example communication network 100 also include gateway routers to interconnect the autonomous networks 105A-C to enable network traffic, such as routing information, IP traffic, etc., to be exchanged among the autonomous networks 105A-C. The gateway router(s) of the autonomous networks 105A-C can be implemented by any type(s) and/or number of network elements, such as the example Internet gateway routers (IGRs) 120A, 120B1, 120B2 and 120C illustrated in the example of FIG. 1, and/or any other type(s) and/or number of network elements, such as one or more autonomous system boundary routers (ASBRs), area border routers (ABRs), gateways, bridges, servers, etc. For example, in the communication network 100 of FIG. 1, the example IGRs 120A and 120B1 interconnect or, more generally, enable communication between, the example autonomous network 105A and 105B (e.g., via one or more intervening networks, which are not shown in the figure). Similarly, the example IGRs 120B2 and 120C interconnect or, more generally, enable communication between, the example autonomous network 105B and 105C (e.g., via one or more intervening networks, which are not shown in the figure).

In the example communication network 100 of FIG. 1, the PE routers 110A-B and the IGRs 120A, 120B1, 120B2 and 120C implement advertising of flowspec NLRI data specifying QoS classes for identified network flows to enable real-time, scalable QoS treatment of network packets exchanged between, for example, the border elements 115A and 115C. The following is an example problem that can be solved by the advertisement of flowspec NLRI data specifying QoS classes for identified network flows in the example communication network 100 of FIG. 1. Consider an example scenario in which the autonomous networks 105A and 105C of FIG. 1 provide VoIP service to customer endpoints served by the respective border elements 115A and 115C. As such, signaling traffic (e.g., SIP traffic) and media traffic (e.g., RTP traffic) flow between the networks 105A and 105C and their respective customer endpoints via the respective border elements 115A and 115C, which may be implemented by SBCs in the case of a VoIP service. Further, assume that a customer of network 105A places a voice call to a customer of network 105C. Because networks 105A and 105C use VoIP to handle voice calls, it would be desirable if network 105A could route the call to network 105C as IP traffic instead of as circuit switched voice traffic carried by the public switched telephone network (PSTN), as may be done today for voice traffic exchanged between different telecommunications networks.

However, in the illustrated example of FIG. 1, there is no direct IP connection between networks 105A and C. Instead, networks 105A and 105C are interconnected by (e.g., are peered with and/or purchase transit from) the autonomous network 105B. Although it may be assumed that the networks 105A and C can ensure that adequate QoS treatment is provided for the VoIP call within their respective networks, in the past, the IP peering connections between networks 105A and 105B, and between networks 105B and 105C, have been limited to providing a best effort QoS treatment of data exchanged between networks. As such, if congestion occurs on the interface between networks 105A and 105B, the interface between networks 105B and 105C, or both, VoIP packets for voice calls between the customers of networks 105A and 105C may be lost or unacceptably delayed because, under a best effort treatment, the VoIP packets receive no priority over any other traffic exchanged over those internetwork interfaces.

The advertisement of flowspec NLRI data specifying QoS classes for identified network flows, as disclosed herein, can solve the problem of ensuring proper QoS treatment of traffic exchanged between different networks, such as between the autonomous networks 105A and 105B, and between the autonomous networks 105B and 105C, of FIG. 1. As described in greater detail below, the border routers in the communication network 100, such as the PE routers 110A-C and the IGRs 120A-C, advertise and propagate routing information that identifies network flows and the QoS classes for the network flows identified in the routing information. For example, to advertise and propagate such routing information, the IGRs 120A-C can employ the external border gateway protocol (eBGP), which crosses autonomous system network (ASN) boundaries, and which is augmented as disclosed herein to specify the QoS treatment of real time traffic flows identified based on (i) the destination prefixes reachable by the border elements 115A and 115C that are to receive the flows, and also (ii) the protocol (e.g., RTP) that is employed by the flow. This solution of advertising flowspec NLRI data specifying QoS classes for identified network flows is dynamic and differs from other approaches in that, for example, the request for QoS treatment is initiated, not by the network element originating the flow, but by the network element receiving the flow. Furthermore, unlike RSVP, the advertisement of flowspec NLRI data specifying QoS classes for identified network flows, as disclosed herein, does not require the network elements to expend resources maintaining flow states.

Figure 2:
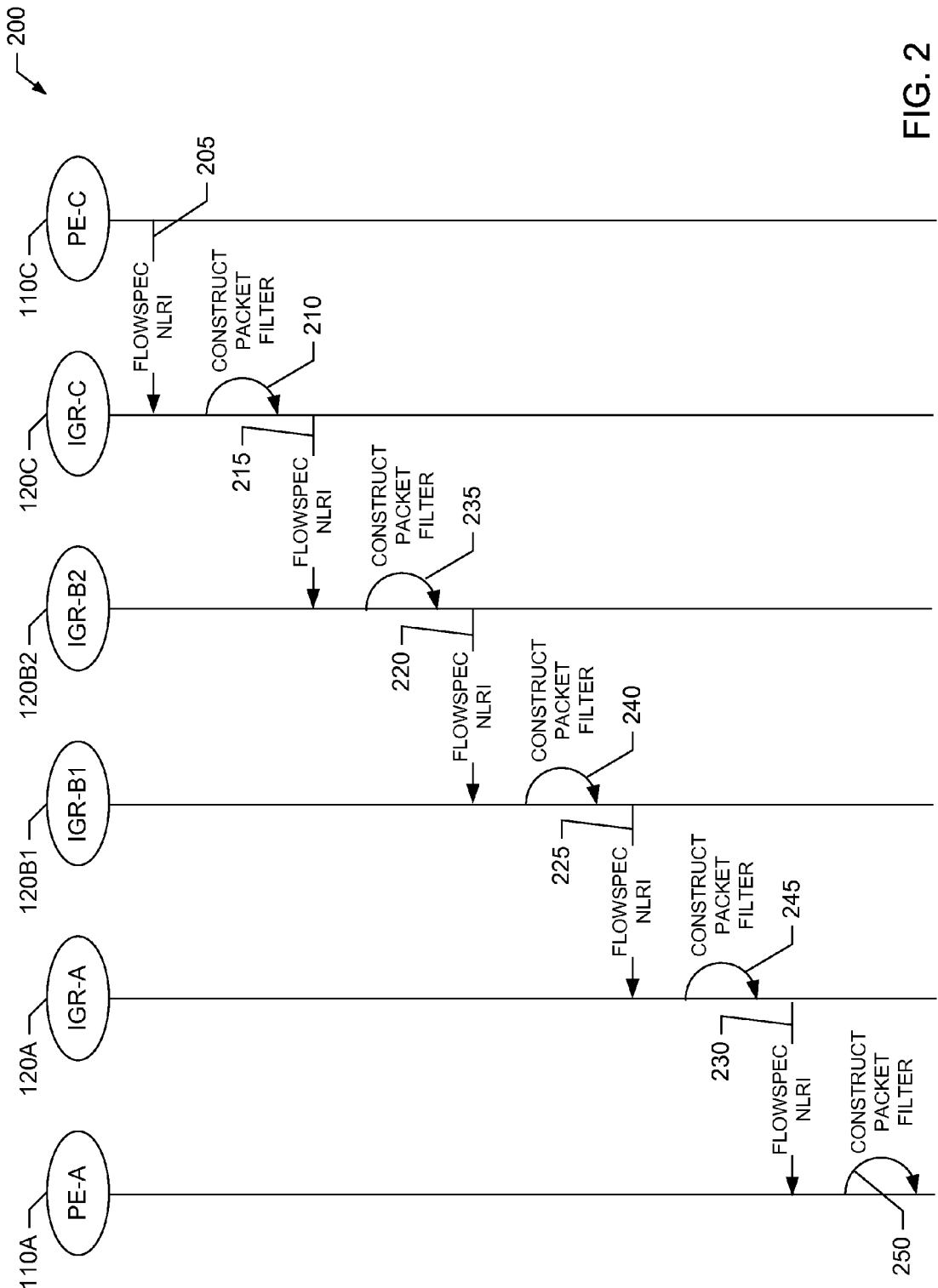
FIG. 2 is a message sequence diagram illustrating example control plane signaling to implement the advertising of network layer reachability information specifying a QoS for an identified network flow in the example communication network of FIG. 1.

With the foregoing in mind, an example message sequence diagram 200 illustrating example control plane signaling to implement the advertising of flowspec NLRI data specifying a QoS class for an identified network flow in the example communication network 100 of FIG. 1 is illustrated in FIG. 2. With reference to FIGS. 1 and 2, the message sequence diagram 200 begins with the PE router 110C advertising flowspec NLRI data specifying a QoS class for network packets having characteristics that match an identified network flow capable of being received by the border element 115C. For example, the border element 115C may correspond to an SBC configured to provide VoIP service to a group of network addresses in a customer network served by the autonomous network 105C. In such an example, the border element 115C allows the service provider of the autonomous network 105C to hide the network addresses of the actual customer endpoints that are to receive the VoIP service behind the border element 115C. Accordingly, VoIP traffic destined to the customer endpoints behind the border elements 115C will have a destination address corresponding to the network address (e.g., IP network prefix) of the border element 115C. Thus, in the illustrated example, the PE router 110C may advertise flowspec NLRI data specifying a particular QoS class for a network flow that corresponds to the VoIP traffic that is to be received by the border element 115C and, thus, has a destination address corresponding to the network address of the border element 115C. By using the network address of the border element 115C, the network flow can be specified by a destination address that is relatively static, rather than using the potentially numerous, dynamic addresses associated with the customer endpoints being served by, and hidden behind, the border element 115C, which can further enhance the scalability of the methods, apparatus and articles of manufacture disclosed herein.

In the illustrated example of FIG. 2, to advertise flowspec NLRI data specifying a QoS class for an identified network flow that is receivable by the border element 115C, the PE router 110C sends an example routing message 205 that includes network layer reachability information specifying a particular network flow and including a QoS class specified for the particular network flow. For example, the routing message 205 can be implemented by a BGP UPDATE message including NLRI data identifying a network prefix (e.g., a group of network addresses) that is reachable via the PE router 110C. In the illustrated example, the network prefix (e.g., the group of network addresses) identified in the NLRI data of the routing message 205 corresponds to the network prefix of the border element 115C. Additionally, a BGP UPDATE message used to implement the routing message 205 can identify a particular network flow using, for example, the flow specification rules defined in IETF RFC 5575. For example, the routing message 205 can identify a particular network flow by a combination of the network prefix (e.g., associated with the border element 115C) identified in the NLRI data, which represents the destination of the particular flow, and a protocol type, which identifies the type of protocol used to convey network packets included in the network flow. Accordingly, the flowspec NLRI data provided in the routing message 205 can include the NLRI data identifying the destination network prefix for a particular network flow, and the protocol type specified for the flow.

However, unlike prior routing messages, such as prior BGP UPDATE messages, the flowspec NLRI data included in the routing message 205 is augmented to include a QoS class that has been specified for the particular network flow identified in the message. The QoS class for a particular network flow receivable by the border element 115C and, thus, receivable at the PE router 110C, can be specified, for example, during a configuration procedure that occurs when the border element 115C is first homed to the PE router 110C, and/or via configuration information provided to the PE router 110C via a configuration interface (not shown), control signaling received from a network management system (not shown), etc. Example protocol types can include, but are not limited to, protocols such as RTP, SIP, etc. Example QoS classes can include, but are not limited to, classes such as "Real Time," "Best Effort," etc. For example, a routing message 205 that is to advertise flowspec NLRI data specifying a QoS class that is better than best-effort for a VoIP traffic flow to be received by the border element 115C could include the following flowspec NLRI and QoS class information:

NLRI network prefix=an IP network prefix of the border element 115C (e.g., which is to receive the VoIP traffic for customer endpoint(s) served by the border element 115C);
Protocol type=RTP; and
QoS class setting=Real Time.

In the illustrated examples of FIGS. 1 and 2, the PE router 110C sends the routing message 205 to its next-hop upstream router(s), such as the IGR 120C, to advertise, in the autonomous network 105C, flowspec NLRI data specifying a QoS class for an identified network flow having the PE router 110C as a destination. In response to receiving the routing message 205, the IGR 120C performs an example procedure 210 to process the received routing message 205. For example, the procedure 210 may store the flowspec NLRI data and specified QoS class for the network flow identified in the routing message. Additionally or alternatively, the procedure 210 may construct a packet filter for use in filtering received packets to identify packets included in the identified network flow and to route such packets according to the specified QoS.

In the illustrated example of FIGS. 1 and 2, the flowspec NLRI data and the specified QoS information advertised by the PE router 110C via the routing message 205 continues to be propagated upstream from the IGR 120C to its next-hop upstream router(s), such as the IGR 120B2, via an example routing message 215, thereby making this information available to the autonomous network 105B. The routing message 215 may be similar to, or different from, the routing message 205. Similarly, the IGR 120B2 propagates this flowspec NLRI data and the specified QoS information to its next-hop upstream router(s), such as the IGR 120B1, via an example routing message 220, which may be similar to, or different from, the routing messages 205-210. The propagation of this flowspec NLRI data and the specified QoS information continues upstream in an example routing message 225 sent by the IGR 120B1 to its next-hop upstream router(s), such as the IGR 120A (thereby providing this information to the autonomous network 105A), and then in an example routing message 230 sent by the IGR 120A to its next-hop upstream router(s), such as the PE router 110A. The routing messages 225 and 230 may be similar to, or different from, the other routing messages 205, 215 and/or 220. In this way, the QoS class specified for the network flow identified in the flowspec NLRI data advertised by the PE 120C is propagated and provided to the different autonomous networks 105A, 105B and 105C. Additionally, in the illustrated example of FIGS. 1 and 2, each of the routers receiving the flowspec NLRI data and the specified QoS information advertised by the PE router 110C performs a respective procedure to store the data and construct a packet filter to filter and route packets associated with the identified network flow according to the specified QoS. For example, the IGR 120B2 performs an example procedure 235, the IGR 120B1 performs and example procedure 240, the IGR 120A performs an example procedure 245, and the example PE router 110A performs an example procedure 250, each of which may be similar to the procedure 210 performed by the IGR 120C.

Figure 3:
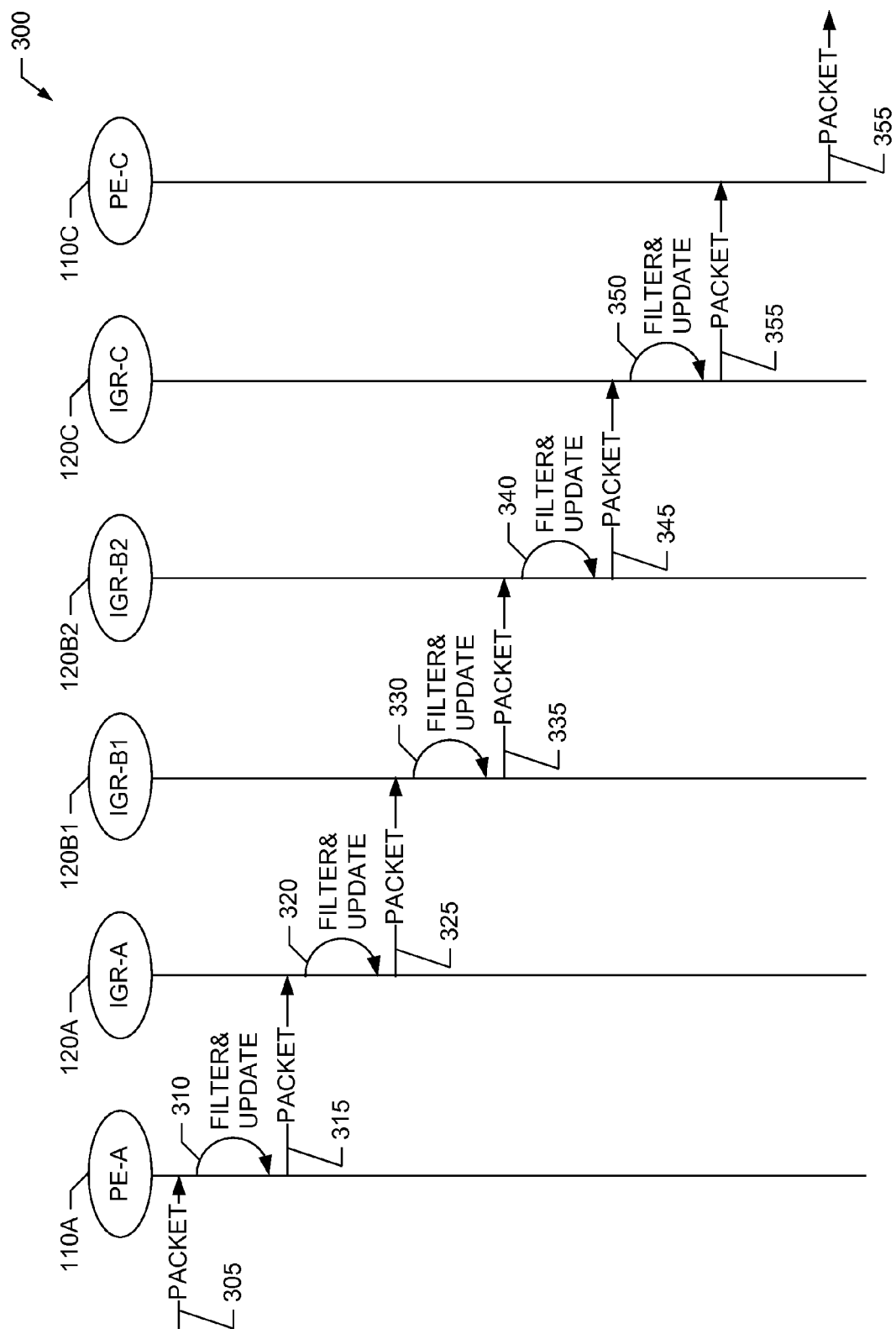
FIG. 3 is a message sequence diagram illustrating communication of an example data plane flow having a QoS advertised via the example control plane signaling of FIG. 2.

An example message sequence diagram 300 illustrating communication of an example data plane flow having a QoS advertised via the example control plane signaling of FIG. 2 in the example communication network 100 of FIG. 1 is illustrated in FIG. 3. The example message sequence diagram 300 begins with the PE router 110A receiving an example network packet 305 and performing an example procedure 310 to filter the network packet 305 using the packet filter constructed via the procedure 250. The filtering procedure 310 processes the destination address and protocol type of the network packet 305 to determine whether the destination address and protocol type are associated with a network flow for which a QoS class was specified in flowspec NLRI data that was received via the example control plane signaling of FIG. 2 (e.g., via the routing message 230). If the network packet 305 is not associated with any specified QoS, then the network packet 305 may be associated with a default QoS, such as a best-effort QoS.

However, in the illustrated example of FIG. 3, the network packet 305 has a destination address that matches a network prefix (or destination address) included in flowspec NLRI data advertised by the PE router 110C and stored at the PE router 110A. Furthermore, the network packet 305 has a protocol type that matches the protocol type included in this NLRI data. Accordingly, PE router 110A (e.g., via the process 310) determines that the network packet 305 is associated with the network flow identified by the network prefix (or destination address) and protocol type included in the flowspec NLRI data advertised by the PE router 110C and stored at the PE router 110A. As such, the PE router 110A (e.g., via the process 310) further associates the network packet 305 with the QoS class included in the flowspec NLRI data advertised by the PE router 110C and stored at the PE router 110A. For example, referring to the example of FIG. 2 described above, if the network packet 305 has a destination address that corresponds to the network prefix of the border element 115C, and a protocol type of RTP, then according to the flowspec NLRI data advertised by the PE router 110A via the routing message 205A, the PE router 110A may associate the network packet 305 with a real-time QoS class.

After associating the network packet 305 with a QoS class, the PE router 110A (e.g., via the procedure 310) further processes the network packet 305 to enable routing of the packet according to its QoS class. For example, the PE router 110A may set and/or update a QoS bit field included in the packet 305 to a value used in the autonomous network 105A to represent the particular QoS class associated with the network packet 305. For example, the PE router 110A (e.g., via the process 310) may set/update the DSCP or TOS bits of the network packet 305 to an appropriate QoS value if the packet is an IPV4 or IPV6 packet, or set/update the experiment (EXP) bits of the network packet 305 to an appropriate QoS value if the packet is an multiprotocol label switching (MPLS) packet, etc. This QoS value may then be evaluated by downstream network elements in the autonomous network 105A to enable the proper QoS treatment of the network packet 305.

Additionally or alternatively, in some examples, the PE router 110A includes one or more routing queues used to store and forward packets having different qualities of service. In such examples, the PE router 110A (e.g., via the process 310) can assign the network packet 305 to an appropriate routing queue (e.g., a best-effort queue, a real-time queue, etc.) that is associated with the QoS class that was specified for the network packet 305 according to the advertised flowspec NLRI data. In the illustrated example, the PE router 110A then routes the network packet 305, which is represented as network packet 315 to indicate that the packet has been updated to include a QoS value representing the packet's specified QoS class, to its downstream routers, which includes the IGR 120A in the illustrated example.

In the illustrated example of FIGS. 1 and 3, the IGR 120A receives the network packet 315 and performs a packet filtering and update procedure 320 similar to the procedure 310. However, the packet filtering and update procedure 320 performed by the IGR 120A uses the packet filter constructed via the procedure 245 based on the flowspec NLRI data and specified QoS class that was received via the example control plane signaling of FIG. 2 (e.g., via the routing message 225). In the illustrated example, the IGR 120A then routes the network packet 315, which is represented as network packet 325 to indicate that the packet may have been updated via the process 320 to include an updated QoS value representing the packet's specified QoS class, to its downstream routers, which includes the IGR 120B1 in the illustrated example.

In the illustrated example of FIGS. 1 and 3, the IGR 120B1 receives the network packet 325 and performs a packet filtering and update procedure 330 similar to the procedures 310 and 320. However, the packet filtering and update procedure 330 performed by the IGR 120B1 uses the packet filter constructed via the procedure 240 based on the flowspec NLRI data and specified QoS class that was received via the example control plane signaling of FIG. 2 (e.g., via the routing message 220). In the illustrated example, the IGR 120B1 then routes the network packet 325, which is represented as network packet 335 to indicate that the packet may have been updated via the process 320 to include an updated QoS value used in the autonomous network 105B to represent the packet's specified QoS class, to its downstream routers, which includes the IGR 120B2 in the illustrated example. In some examples, the QoS value used to represent a particular QoS class in one autonomous network, such as the autonomous network 105A, may be different from the QoS value used to represent this same QoS class in another autonomous network, such as the autonomous network 105A.

In the illustrated example of FIGS. 1 and 3, the IGR 120B2 receives the network packet 335 and performs a packet filtering and update procedure 340 similar to the procedures 310, 320 and 330. However, the packet filtering and update procedure 340 performed by the IGR 120B1 uses the packet filter constructed via the procedure 235 based on the flowspec NLRI data and specified QoS class that was received via the example control plane signaling of FIG. 2 (e.g., via the routing message 215). In the illustrated example, the IGR 120B2 then routes the network packet 335, which is represented as network packet 345 to indicate that the packet may have been updated via the process 340 to include an updated QoS value representing the packet's specified QoS class, to its downstream routers, which includes the IGR 120C in the illustrated example.

In the illustrated example of FIGS. 1 and 3, the IGR 120C receives the network packet 345 and performs a packet filtering and update procedure 350 similar to the procedures 310, 320, 330 and 340. However, the packet filtering and update procedure 350 performed by the IGR 120C uses the packet filter constructed via the procedure 210 based on the flowspec NLRI data and specified QoS class that was received via the example control plane signaling of FIG. 2 (e.g., via the routing message 205). In the illustrated example, the IGR 120C then routes the network packet 345, which is represented as network packet 355 to indicate that the packet may have been updated via the process 350 to include an updated QoS value used in the autonomous network 105C to represent the packet's specified QoS class, to its downstream routers, which includes the PE router 110C in the illustrated example. In some examples, the QoS value used to represent a particular QoS class in autonomous network 105C may be different from the QoS value(s) used to represent this same QoS class in the autonomous network 105A and/or 105B.

In the illustrated example of FIGS. 1 and 3, the PE router 110C receives the network packet 355 and routes the packet based on its destination address to the appropriate recipient. For example, if the destination address of the network packet 355 is an address associated with the border element 115C, then the PE router 110C routes the network packet 355 to the border element 115C. Thus, the examples of FIGS. 1-3 demonstrate that end-to-end internetwork (or intercarrier, interprovider, etc.) QoS treatment across IP peering connections can be achieved using the advertising of flowspec NLRI data specifying QoS classes for identified flows, as disclosed herein.

Although the previous examples have focused on the QoS treatment of VoIP data exchanged in the example communication network 100 of FIG. 1, the advertising of flowspec NLRI data specifying QoS classes for identified network flows as disclosed herein is not limited thereto. For example, advertisement of flowspec NLRI data specifying QoS classes for identified network flows, as disclosed herein, can be used in communication networks having any number and/or types of different networks, network elements, PE routers, IGRs, border elements, etc. Additionally or alternatively, the QoS classes for identified network flows can be advertised in other types of routing information propagated using other type(s) of routing protocols.

Figure 4:
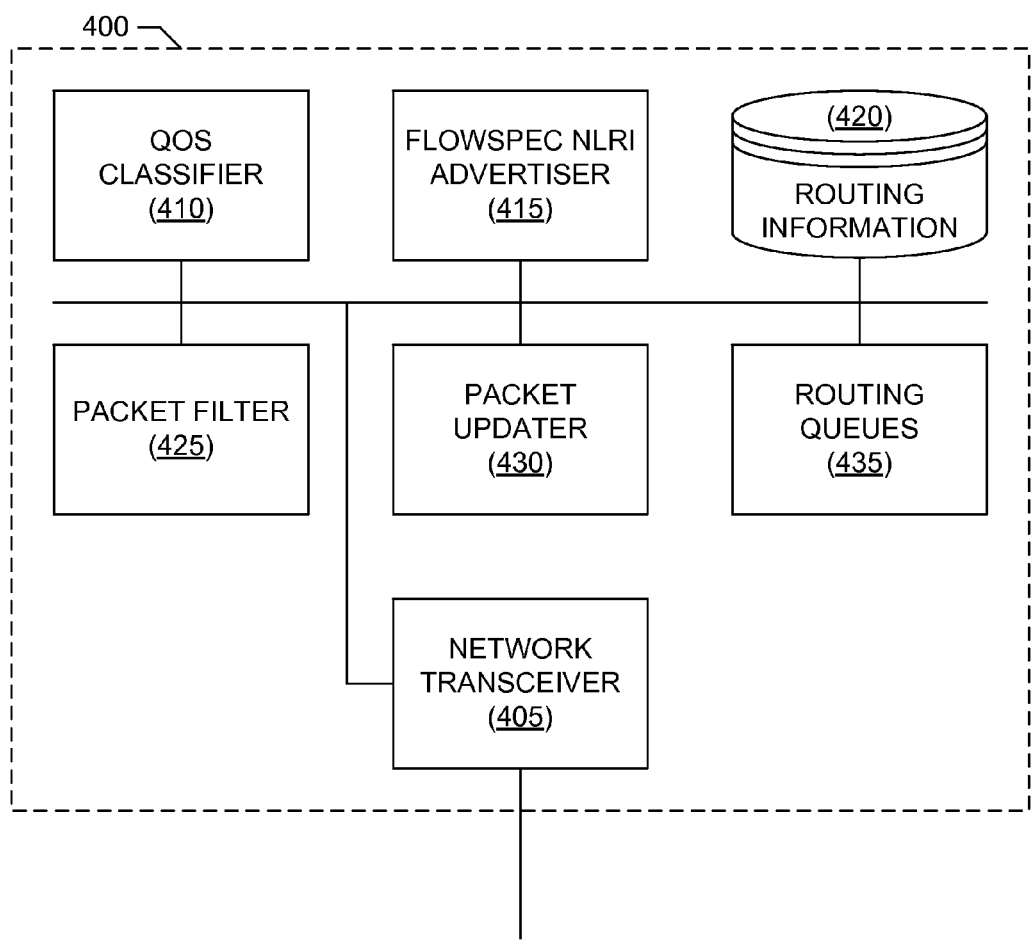
FIG. 4 is a block diagram of an example provider edge router that may be used to implement the example communication network of FIG. 1.

A block diagram of an example PE router 400 that may be used to implement the PE routers 110A and/or 110B of FIGS. 1-3 is illustrated in FIG. 4. The PE router 400 of FIG. 4 includes an example network transceiver 405 to send and receive data via a communication network, such as the autonomous networks 105A, 105B and/or 105C. As such, the network transceiver 405 can be implemented by any type of data transceiver technology capable of interfacing with the communication network via which the PE router 400 is to send and receive data.

The PE router 400 of FIG. 4 also includes an example QoS classifier 410 to obtain QoS classification information for network flows to be received by network elements (such as the border element 115C) that are reachable via the PE router 400. For example, the QoS classifier 410 may receive information specifying a QoS class for a particular network flow during a configuration procedure that occurs when the reachable network element (such as the border element 115C) is initially homed to the PE router 400 (e.g., when the reachable network element, such as the border element 115C, is initially configured to communicate with and obtain network access from the PE router 400). Additionally or alternatively, the QoS classifier 410 may receive information specifying a QoS class for a particular network flow that is provided by, for example, an administrator via a configuration interface of the PE router 400 and/or control signaling received from a network management system.

The PE router 400 of FIG. 4 further includes an example flowspec NLRI advertiser 415 to advertise flowspec NLRI data that provides flow specification information for destination addresses reachable via the PE router 400. The flowspec NLRI data advertised by the flowspec NLRI advertiser 415 also includes, if available, the QoS class obtained by the QoS classifier 410 for the network flow identified in a particular flowspec NLRI advertisement. For example, and with reference to FIGS. 1 and 2, the flowspec NLRI advertiser 415 can advertise the flowspec NLRI data with QoS class information in a routing message, such as a BGP UPDATE message or any other type of message for providing routing information.

In addition to advertising flowspec NLRI data with QoS class information to upstream routers, the PE router 400 also receives flowspec NLRI data with QoS class information from downstream routers (which may be the same as, or different from, the upstream routers) to enable the PE router 400 to route data to destinations that are reachable via the downstream routers. As such, the PE router 400 includes an example routing information storage 420 to store routing information (e.g., in the form of a routing information database) that includes the received flowspec NLRI data and associated QoS information, as well as the flowspec NLRI data and associated QoS information advertised by the PE router 400. The routing information storage 420 can be implemented by any type or combination of temporary and/or permanent tangible storage media, such as one or more of cache, volatile memory, flash memory, disk storage, etc., including but not limited to one or more of the mass storage devices 1128 and/or volatile memory 1114 in the example processing system 1100 of FIG. 11, which is described in greater detail below.

To filter received network packets for proper QoS treatment, the PE router 400 of FIG. 4 includes an example packet filter 425. In the illustrated example, the packet filter 425 uses the flowspec NLRI data advertised/propagated from the downstream routers (and which is stored in the routing information storage 420) to configure the packet filter 425 (e.g., as described above in connection with FIGS. 1 and 2) to determine whether a received network packet is associated with a network flow for which a QoS class has been received. During operation, and with reference to FIGS. 1 and 3, the packet filter 425 may compare the destination address and protocol type of a received network packet with the destination prefix(es) (or address(es)) and protocol type(s) identified in the previously received flowspec NLRI data. If a match is found, the packet filter 425 determines that the received network packet is associated with the network flow identified by the matching destination prefix (or address) and protocol type, and further associates the network packet with a QoS class identified in the received flowspec NLRI data as being specified for the matching network flow. In some examples, if no match is found, the packet filter 425 associates the received network packet with a default QoS, such as a best-effort QoS. In some examples, different default QoS classes may be used for different types of network packets. For example, the packet filter 425 may be configured to select a particular default QoS class based on the protocol type (and/or some other characteristic) of the received network packet.

To provide proper QoS treatment of received network packets, the PE router 400 of FIG. 4 also includes an example packet updater 430. In the illustrated example, the packet updater 430 updates a received network packet to include a value (e.g., in a bit field of the packet's header) that represents the QoS class for the received packet (e.g., as identified by the packet filter 425 using QoS class information included with previously received flowspec NLRI data). For example, if the received network packet is an IPV4 or IPV6 packet, the packet filter 425 may set the DSCP or TOS bits of the network packet to a value representative of the packet's QoS class in the autonomous network to which the PE router 400 belongs. In some examples, if the received network packet is an MPLS packet, the packet filter 425 may set the EXP bits of the network packet to a value representative of the packet's QoS class in the autonomous network to which the PE router 400 belongs. As noted above, in some examples, different autonomous networks may use different values to represent the same QoS class.

In some examples, the PE router 400 further includes one or more example routing queues 435 to store and forward packets having different QoS classes. In such examples, the packet filter 425 may send or otherwise provide a received network packet to a particular one of the routing queues 435 based on the QoS class for the received packet (e.g., as identified by the packet filter 425 using QoS class information included with previously received flowspec NLRI data). For example, the PE router 400 may include a first routing queue 435 to store and forward packets having a real-time QoS, a second routing queue 435 to store and forward packets having a best-effort QoS, etc. In such examples, the PE router 400 may transmit (e.g., via the network transceiver 405) the packets in different queues 435 at different rates commensurate with the QoS associated with the different queues 435.

Figure 5:
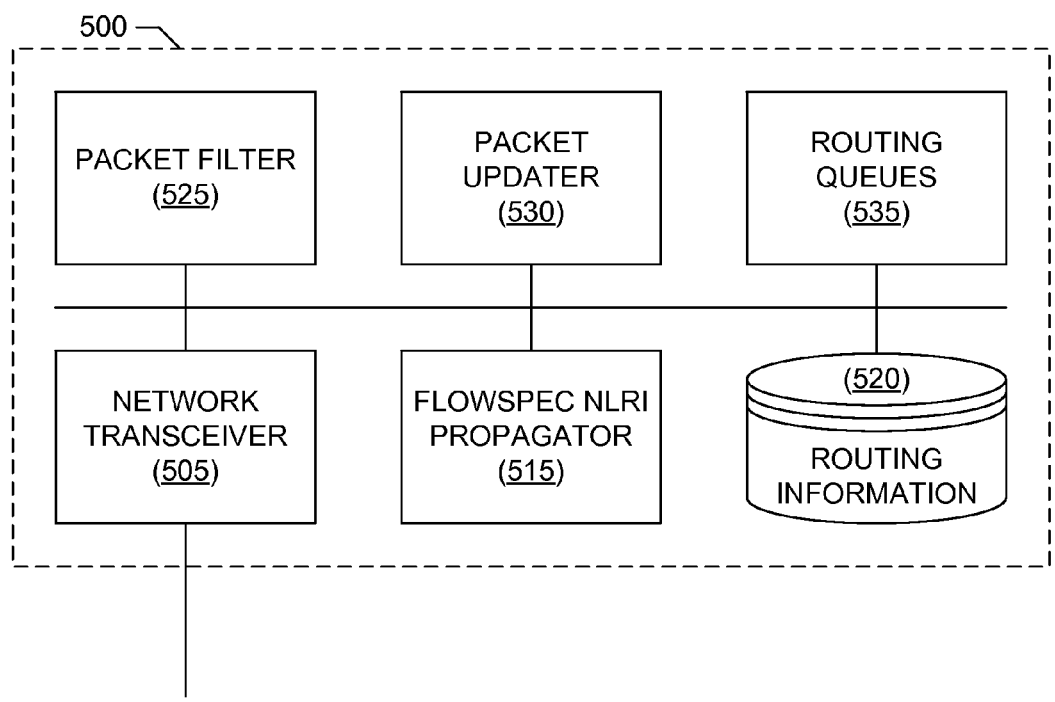
FIG. 5 is a block diagram of an example Internet gateway router that may be used to implement the example communication network of FIG. 1.

A block diagram of an example IGR 500 that may be used to implement the IGRs 120A, 120B1, 120B2 and/or 120C of FIGS. 1-3 is illustrated in FIG. 5. The IGR 500 of FIG. 5 includes an example network transceiver 505 (which may be similar to the network transceiver 405 of FIG. 4) to send and receive data via a communication network, such as the autonomous networks 105A, 105B and/or 105C. As such, the network transceiver 505 can be implemented by any type of data transceiver technology capable of interfacing with the communication network via which the IGR 500 is to send and receive data.

The IGR 500 of FIG. 5 also includes an example flowspec NLRI propagator 515 to propagate flowspec NLRI data, including QoS class information, received from other network elements (e.g., such as one or more of the PE routers 110A and 110C, and/or one or more of the IGRs 120A, 120B1, 120B2 and/or 120C). For example, with reference to FIGS. 1 and 2, the IGR 500 may receive (e.g., via the network transceiver 505) flowspec NLRI data, including QoS class information, from one or more downstream routers in one or more routing message, and then forward this received flowspec NLRI data, including the QoS class information, to one or more upstream (e.g., next-hop) routers. The routing update messages may be implemented by BGP UPDATE messages or any other type of message for providing routing information.

In the illustrated example of FIG. 5, the IGR 500 includes an example routing information storage 520 (which may be similar to the routing information storage 420 of FIG. 4) to store routing information (e.g., in the form of a routing information database) that includes the received flowspec NLRI data and associated QoS information. The routing information storage 520 can be implemented by any type or combination of temporary and/or permanent tangible storage media, such as one or more of cache, volatile memory, flash memory, disk storage, etc., including but not limited to one or more of the mass storage devices 1128 and/or volatile memory 1114 in the example processing system 1100 of FIG. 11, which is described in greater detail below.

To filter received network packets for proper QoS treatment, the IGR 500 of FIG. 5 includes an example packet filter 525 (which may be similar to the packet filer 425 of FIG. 4). In the illustrated example, the packet filter 525 uses the flowspec NLRI data advertised/propagated from the downstream routers (and which is stored in the routing information storage 520) to configure the packet filter 525 (e.g., as described above in connection with FIGS. 1 and 2) to determine whether a received network packet is associated with a network flow for which a QoS class has been received. During operation, and with reference to FIGS. 1 and 3, the packet filter 525 may compare the destination address and protocol type of a received network packet with the destination prefixes (or addresses) and protocol types identified in the previously received flowspec NLRI data. If a match is found, the packet filter 525 determines that the received network packet is associated with the network flow identified by the matching destination prefix (or address) and protocol type, and further associates the network packet with a QoS class identified in the received flowspec NLRI data as being specified for the matching network flow. In some examples, if no match is found, the packet filter 525 associates the received network packet with a default QoS, such as a best-effort QoS. In some examples, different default QoS classes may be used for different types of network packets. For example, the packet filter 525 may be configured to select a particular default QoS class based on the protocol type (and/or some other characteristic) of the received network packet.

To provide proper QoS treatment of received network packets, the IGR 500 of FIG. 5 also includes an example packet updater 530 (which may be similar to the packet updater 430 of FIG. 4). In the illustrated example, the packet updater 530 updates a received network packet to include a value (e.g., in a bit field of the packet's header) that represents the QoS class for the received packet (e.g., as identified by the packet filter 525 using QoS class information included with previously received flowspec NLRI data). For example, if the received network packet is an IPV4 or IPV6 packet, the packet filter 525 may set the DSCP or TOS bits of the network packet to a value representative of the packet's QoS class in the autonomous network to which the IGR 500 belongs. In some examples, if the received network packet is an MPLS packet, the packet filter 525 may set the EXP bits of the network packet to a value representative of the packet's QoS class in the autonomous network to which the IGR 500 belongs. As noted above, in some examples, different autonomous networks may use different values to represent the same QoS class.

In some examples, the IGR 500 further includes one or more example routing queues 535 (which may be similar to the routing queue(s) 435 of FIG. 4) to store and forward packets having different QoS classes. In such examples, the packet filter 525 may send or otherwise provide a received network packet to a particular one of the routing queues 535 based on the QoS class for the received packet (e.g., as identified by the packet filter 525 using QoS class information included with previously received flowspec NLRI data). For example, the IGR 500 may include a first routing queue 535 to store and forward packets having a real-time QoS, a second routing queue 535 to store and forward packets having a best-effort QoS, etc. In such examples, the IGR 500 may transmit (e.g., via the network transceiver 505) the packets in different queues 535 at different rates commensurate with the QoS associated with the different queues 535.

While example manners of implementing the communication network 100 have been illustrated in FIGS. 1-5, one or more of the elements, processes and/or devices illustrated in FIGS. 1-5 may be combined, divided, re-arranged, omitted, eliminated and/or implemented in any other way. Further, the example autonomous networks 105A, 105B and/or 105C, the example PE routers 110A and/or 110C, the example border elements 115A and/or 115C, the example IGRs 120A, 120B1, 120B2 and/or 120C, the example PE router 400, the example network transceiver 405, the example QoS classifier 410, the example flowspec NLRI advertiser 415, the example routing information storage 420, the example packet filter 425, the example packet updater 430, the example routing queue(s) 435, the example IGR 500, the example network transceiver 505, the example flowspec NLRI propagator 515, the example routing information storage 520, the example packet filter 525, the example packet updater 530, the example routing queue(s) 535 and/or, more generally, the example communication network 100 of FIGS. 1-5 may be implemented by hardware, software, firmware and/or any combination of hardware, software and/or firmware. Thus, for example, any of the example autonomous networks 105A, 105B and/or 105C, the example PE routers 110A and/or 110C, the example border elements 115A and/or 115C, the example IGRs 120A, 120B1, 120B2 and/or 120C, the example PE router 400, the example network transceiver 405, the example QoS classifier 410, the example flowspec NLRI advertiser 415, the example routing information storage 420, the example packet filter 425, the example packet updater 430, the example routing queue(s) 435, the example IGR 500, the example network transceiver 505, the example flowspec NLRI propagator 515, the example routing information storage 520, the example packet filter 525, the example packet updater 530, the example routing queue(s) 535 and/or, more generally, the example communication network 100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example communication network 100, the example autonomous networks 105A, 105B and/or 105C, the example PE routers 110A and/or 110C, the example border elements 115A and/or 115C, the example IGRs 120A, 120B1, 120B2 and/or 120C, the example PE router 400, the example network transceiver 405, the example QoS classifier 410, the example flowspec NLRI advertiser 415, the example routing information storage 420, the example packet filter 425, the example packet updater 430, the example routing queue(s) 435, the example IGR 500, the example network transceiver 505, the example flowspec NLRI propagator 515, the example routing information storage 520, the example packet filter 525, the example packet updater 530 and/or the example routing queue(s) 535 are hereby expressly defined to include a tangible computer readable medium such as a memory, digital versatile disk (DVD), compact disk (CD), Blu-ray Disc™, etc., storing such software and/or firmware. Further still, the example communication network 100 of FIGS. 1-5 may include one or more elements, processes and/or devices in addition to, or instead of, those illustrated in FIGS. 1-5, and/or may include more than one of any or all of the illustrated elements, processes and devices.

Flowcharts representative of example machine readable instructions for implementing the example communication network 100, the example autonomous networks 105A, 105B and/or 105C, the example PE routers 110A and/or 110C, the example border elements 115A and/or 115C, the example IGRs 120A, 120B1, 120B2 and/or 120C, the example PE router 400, the example network transceiver 405, the example QoS classifier 410, the example flowspec NLRI advertiser 415, the example routing information storage 420, the example packet filter 425, the example packet updater 430, the example routing queue(s) 435, the example IGR 500, the example network transceiver 505, the example flowspec NLRI propagator 515, the example routing information storage 520, the example packet filter 525, the example packet updater 530 and/or the example routing queue(s) 535 are shown in FIGS. 6-10. In these examples, the machine readable instructions represented by each flowchart may comprise one or more programs for execution by a processor, such as the processor 1112 shown in the example processing system 1100 discussed below in connection with FIG. 11. Furthermore, as used herein, references to a processor that executes instructions to perform operations may mean that the processor itself performs the operations or that the processor instructs or directs another element of an apparatus to perform the operations. The one or more programs, or portion(s) thereof, may be embodied in software stored on a tangible computer readable storage medium such as a CD-ROM, a floppy disk, a hard drive, a digital versatile disk (DVD), a Blu-ray Disc™, or a memory associated with the processor 1112, but the entire program or programs and/or portions thereof could alternatively be executed by a device other than the processor 1112 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 6-10 may be implemented manually. Further, although the example machine readable instructions are described with reference to the flowcharts illustrated in FIGS. 6-10, many other methods of implementing the example communication network 100, the example autonomous networks 105A, 105B and/or 105C, the example PE routers 110A and/or 110C, the example border elements 115A and/or 115C, the example IGRs 120A, 120B1, 120B2 and/or 120C, the example PE router 400, the example network transceiver 405, the example QoS classifier 410, the example flowspec NLRI advertiser 415, the example routing information storage 420, the example packet filter 425, the example packet updater 430, the example routing queue(s) 435, the example IGR 500, the example network transceiver 505, the example flowspec NLRI propagator 515, the example routing information storage 520, the example packet filter 525, the example packet updater 530 and/or the example routing queue(s) 535 may alternatively be used. For example, with reference to the flowcharts illustrated in FIGS. 6-10 the order of execution of the blocks may be changed, and/or some of the blocks described may be changed, eliminated, combined and/or subdivided into multiple blocks.

As mentioned above, the example processes of FIGS. 6-10 may be implemented using coded instructions (e.g., computer readable instructions) stored on a tangible computer readable storage medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage device and/or storage disk, and to exclude propagating signals. Additionally or alternatively, the example processes of FIGS. 6-10 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable storage device and/or storage disk, and to exclude propagating signals. Also, as used herein, the terms "computer readable" and "machine readable" are considered equivalent unless indicated otherwise. Furthermore, as used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 6:
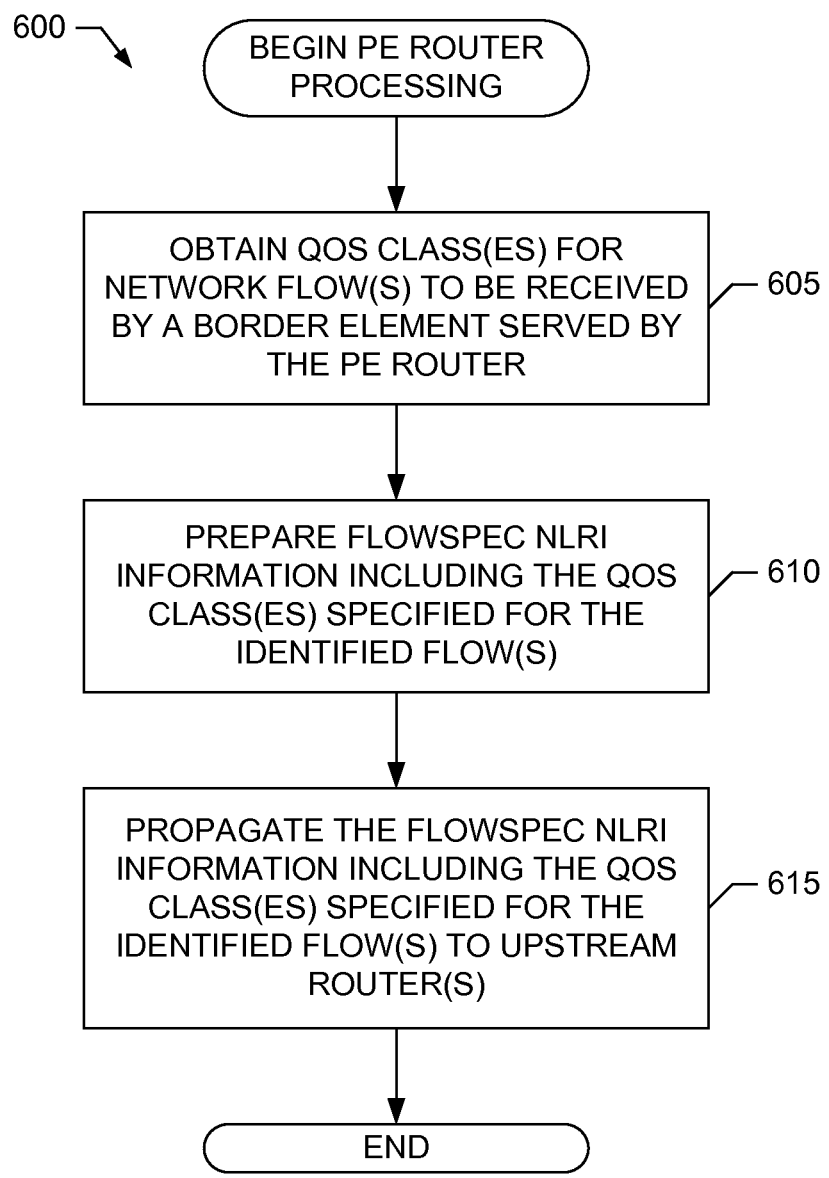
FIG. 6 is a flowchart representative of example machine readable instructions that may be executed to cause the example provider edge router of FIG. 4 to advertise network layer reachability information specifying network flow QoS in the example communication network of FIG. 1.

Example machine readable instructions 600 that may be executed to implement flowspec NLRI advertisement processing in the example PE router 400 of FIG. 4 are represented by the flowchart shown in FIG. 6. For convenience, and without loss of generality, execution of the machine readable instructions 600 is described from the perspective of the PE router 400 being used to implement the example PE router 110C in the example communication system 100. With reference to the preceding figures and associated descriptions, the machine readable instructions 600 of FIG. 6 begin execution at block 605 at which the QoS classifier 410 of the PE router 400 obtains, as described above, one or more QoS classes for one or more respective network flows that are receivable by a network element, such as the border element 115C, served by the PE router 400. At block 610, the flowspec NLRI advertiser 415 of the PE router 400 prepares flowspec NLRI data identifying the network flow(s) (e.g., by destination prefix/addresses and protocol types) that are reachable via the PE router 400, such as those network flow(s) identified at block 605, as described above. In the illustrated example, the flowspec NLRI advertiser 415 also includes QoS class information (e.g., obtained at block 605) with the flowspec NLRI data prepared at block 610 for network flow(s), as described above. At block 615, the flowspec NLRI advertiser 415 advertises, via one or more routing messages as described above, the flowspec NLRI data, with the QoS class(es) specified for the identified network flow(s), to one or more upstream (e.g., next hop) routers, such as the IGR 120C in the communication network 100.

Figure 7:
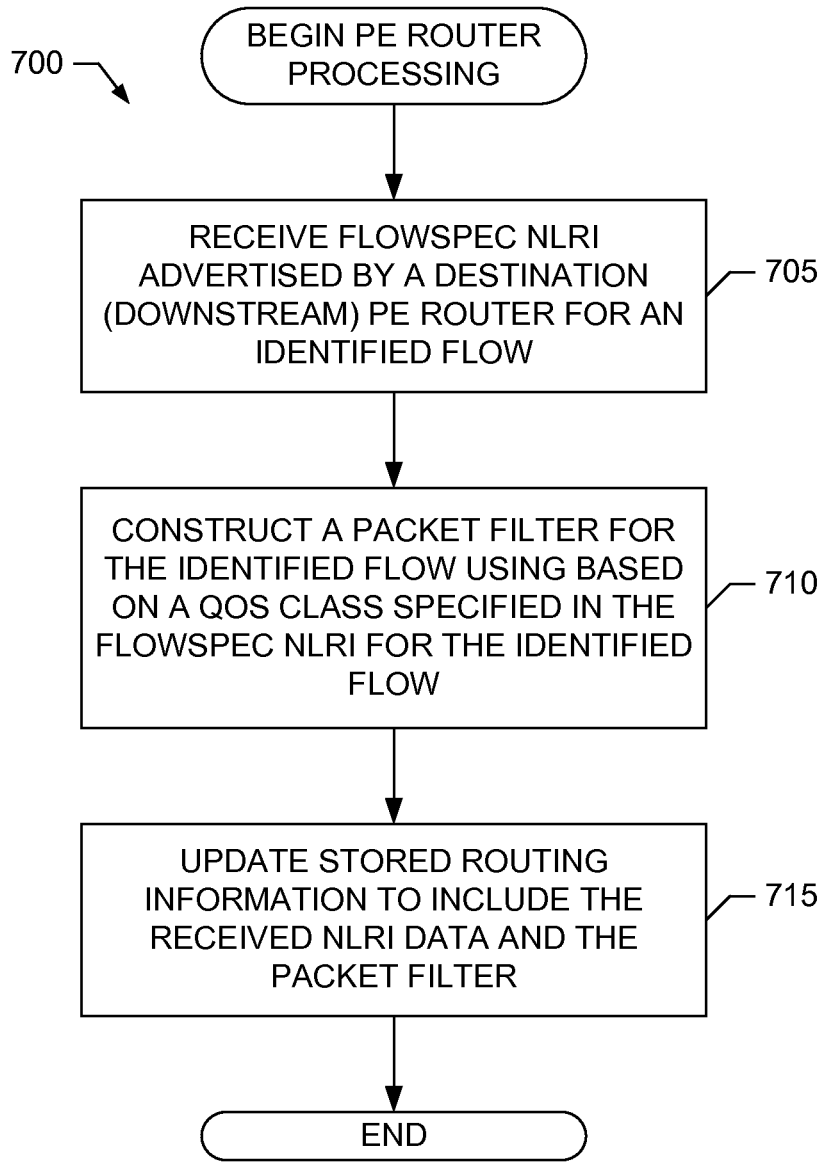
FIG. 7 is a flowchart representative of example machine readable instructions that may be executed to cause the example provider edge router of FIG. 4 to process received network layer reachability information specifying network flow QoS in the example communication network of FIG. 1.

Example machine readable instructions 700 that may be executed to process received flowspec NLRI data including QoS information in the example PE router 400 of FIG. 4 are represented by the flowchart shown in FIG. 7. For convenience, and without loss of generality, execution of the machine readable instructions 700 is described from the perspective of the PE router 400 being used to implement the example PE router 110A in the example communication system 100. With reference to the preceding figures and associated descriptions, the machine readable instructions 700 of FIG. 7 begin execution at block 705 at which the PE router 400 receives (e.g., via the network transceiver 405 of the PE router 400) flowspec NLRI data, including QoS information for the flow identified in the NLRI data, that was advertised by a downstream router, such as the PE router 110C, as described above. At block 710, the PE router 400 constructs a packet filter for the network flow identified in the flowspec NLRI data received at block 705 by, for example, configuring the packet filter 425 of the PE router 400 to recognize the network flow identified in the flowspec NLRI data received at block 705 (e.g., based on destination prefix/addresses and protocol type) and to associate matching network packets with the QoS class specified in the received flowspec NLRI data for this network flow. At block 715, the PE router 400 updates the routing information stored in the routing information storage 420 to contain the flowspec NLRI, including QoS class information, received at block 705 and the packet filter configuration information determined at block 710.

Figure 8:
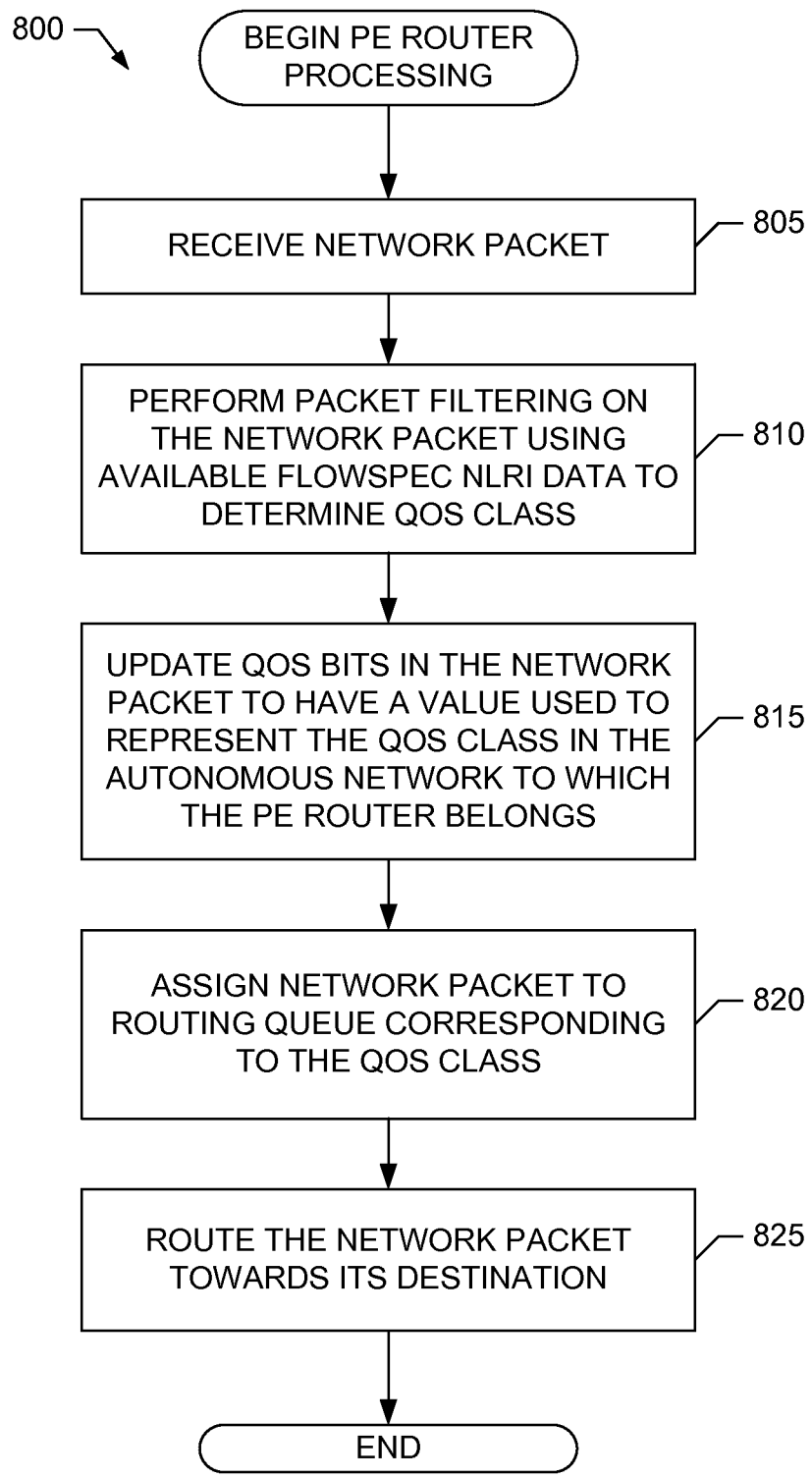
FIG. 8 is a flowchart representative of example machine readable instructions that may be executed to cause the example provider edge router of FIG. 4 to route network packets in the example communication network of FIG. 1 according to received network layer reachability information specifying network flow QoS.

Example machine readable instructions 800 that may be executed to perform network packet routing in the example PE router 400 of FIG. 4 are represented by the flowchart shown in FIG. 8. For convenience, and without loss of generality, execution of the machine readable instructions 800 is described from the perspective of the PE router 400 being used to implement the example PE router 110A in the example communication system 100. With reference to the preceding figures and associated descriptions, the machine readable instructions 800 of FIG. 8 begin execution at block 805 at which the PE router 400 receives (e.g., via the network transceiver 405 of the PE router 400) a network packet to be routed to a downstream destination. At block 810, the packet filter 425 of the PE router 400 performs packet filtering, as described above, on the received network packet using the available flowspec NLRI data stored in the routing information storage 420 to determine the QoS class specified for the received network packet. As described above, in some examples, the packet filter 425 may associate a default QoS class with the received network packet if the packet does not match a network flow for which flowspec NLRI data was received, or if the flowspec NLRI data did not include a QoS class specification.

At block 815, the packet updater 430 of the PE router 400 updates, as described above, the QoS bits in the received network packet to have a value that is used to represent the packet's determined QoS class in the autonomous network (e.g., the autonomous network 105A) to which the PE router 400 belongs. At block 820, the packet filter 425 assigns, as described above, the network packet to a particular one of the routing queues 435 of the PE router 400 that is associated with the packet's determined QoS class. At block 825, the PE router 400 routes the network packet from its assigned queue 435 towards its destination.

For convenience, the example machine readable instructions 600, 700 and 800 have each been described from the perspective of being implemented by the PE router 400 when being used to implement different ones of the PE routers 110A and 110C. However, in many practical examples, each single PE router in the example communication system 100 implements (e.g., in separate processing threads) each of the example machine readable instructions 600, 700 and 800.

Figure 9:
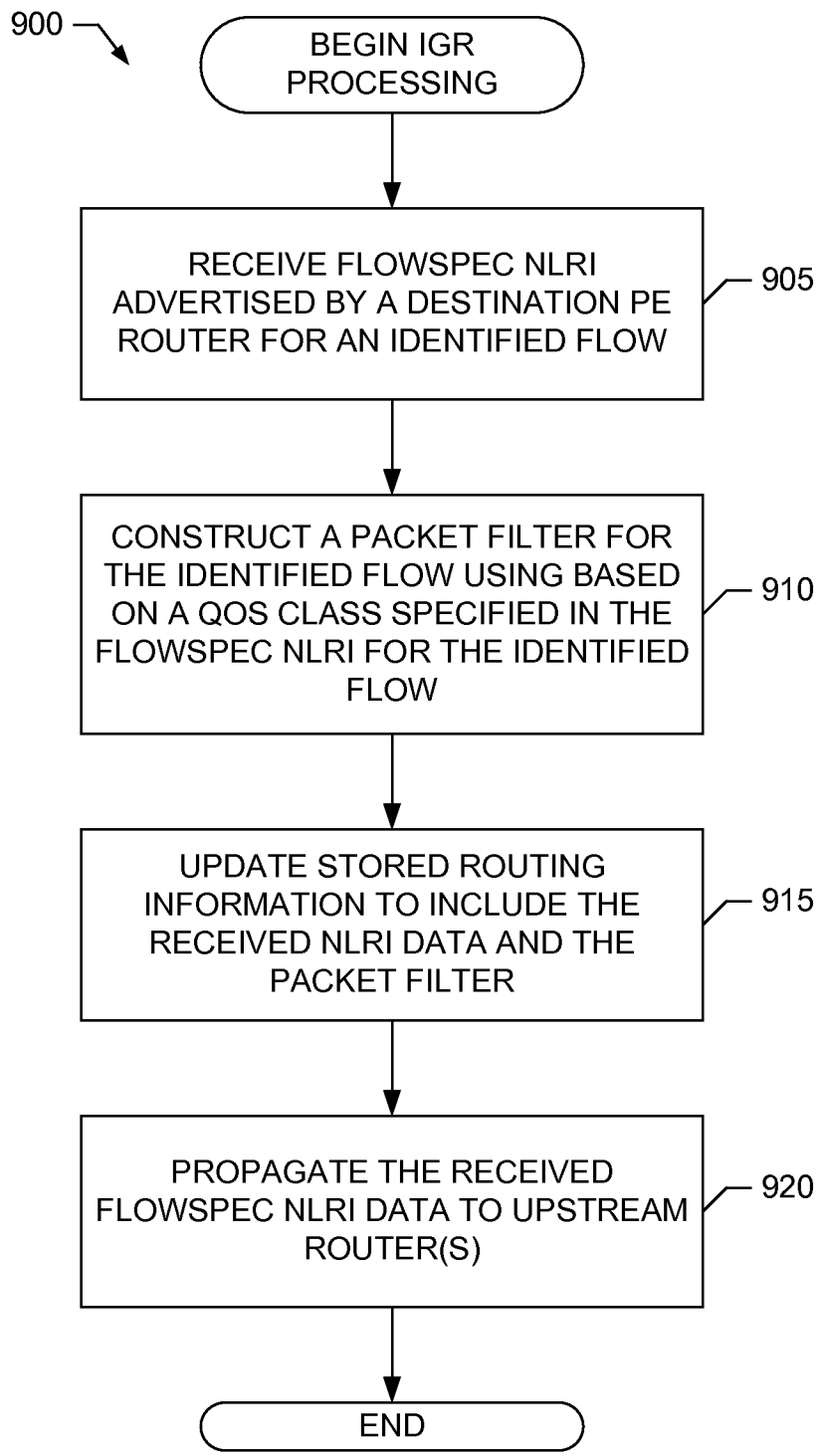
FIG. 9 is a flowchart representative of example machine readable instructions that may be executed to cause the example Internet gateway router of FIG. 5 to process received network layer reachability information specifying network flow QoS in the example communication network of FIG. 1.

Example machine readable instructions 900 that may be executed to process received flowspec NLRI data including QoS information in the example IGR 500 of FIG. 5 are represented by the flowchart shown in FIG. 9. For convenience, and without loss of generality, execution of the machine readable instructions 900 is described from the perspective of the IGR 500 being used to implement the example IGR 120C in the example communication system 100. With reference to the preceding figures and associated descriptions, the machine readable instructions 900 of FIG. 9 begin execution at block 905 at which the IGR 500 receives (e.g., via the network transceiver 505 of the IGR 500) flowspec NLRI data, including QoS information for the flow identified in the NLRI data, that was originally advertised by destination router, such as the PE router 110C, as described above. At block 910, the IGR 500 constructs a packet filter for the network flow identified in the flowspec NLRI data received at block 905 by, for example, configuring the packet filter 525 of the IGR 500 to recognize the network flow identified in the flowspec NLRI data received at block 905 (e.g., based on destination prefix/address and protocol type) and to associate matching network packets with the QoS class specified in the received flowspec NLRI data for this network flow. At block 915, the IGR 500 updates the routing information stored in the routing information storage 520 to contain the flowspec NLRI, including QoS class information, received at block 905 and the packet filter configuration information determined at block 910. At block 920, the flowspec NLRI propagator 515 of the IGR 500 propagates, via one or more routing messages as described above, the flowspec NLRI data, including QoS information, received at block 905 to one or more upstream routers, such as the router 120B2, as described above.

Figure 10:
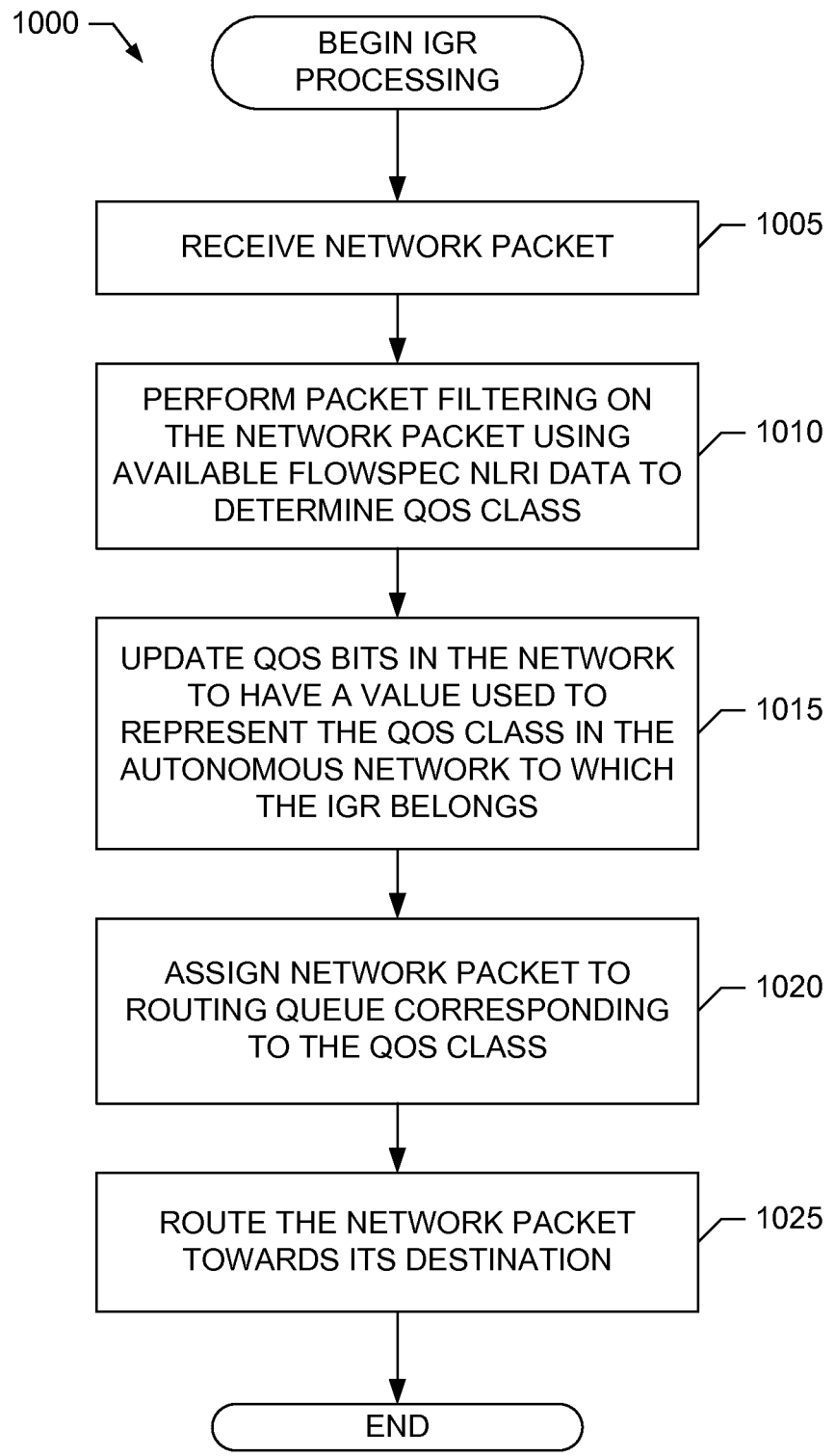
FIG. 10 is a flowchart representative of example machine readable instructions that may be executed to cause the example Internet gateway router of FIG. 5 to route network packets in the example communication network of FIG. 1 according to received network layer reachability information specifying network flow QoS.

Example machine readable instructions 1000 that may be executed to perform network packet routing in the example IGR 500 of FIG. 5 are represented by the flowchart shown in FIG. 10. For convenience, and without loss of generality, execution of the machine readable instructions 1000 is described from the perspective of the IGR 500 being used to implement the example IGR 120A in the example communication system 100. With reference to the preceding figures and associated descriptions, the machine readable instructions 1000 of FIG. 10 begin execution at block 1005 at which the IGR 500 receives (e.g., via the network transceiver 505 of the IGR 500) a network packet to be routed to a downstream destination. At block 1010, the packet filter 525 of the IGR 500 performs packet filtering, as described above, on the received network packet using the available flowspec NLRI data stored in the routing information storage 520 to determine the QoS class specified for the received network packet. As described above, in some examples, the packet filter 525 may associate a default QoS class with the received network packet if the packet does not match a network flow for which flowspec NLRI data was received, or if the flowspec NLRI data did not include a QoS class specification.

At block 1015, the packet updater 530 of the IGR 500 updates, as described above, the QoS bits in the received network packet to have a value that is used to represent the packet's determined QoS class in the autonomous network (e.g., the autonomous network 105A) to which the IGR 500 belongs. At block 1020, the packet filter 525 assigns, as described above, the network packet to a particular one of the routing queues 535 of the IGR 500 that is associated with the packet's determined QoS class. At block 1025, the IGR 500 routes the network packet from its assigned queue 535 towards its destination.

For convenience, the example machine readable instructions 900 and 1000 have each been described from the perspective of being implemented by the IGR 500 when being used to implement different ones of the IGRs 120A and 120C. However, in many practical examples, each IGR in the example communication system 100 implements (e.g., in separate processing threads) each of the example machine readable instructions 900 and 1000.

Figure 11:
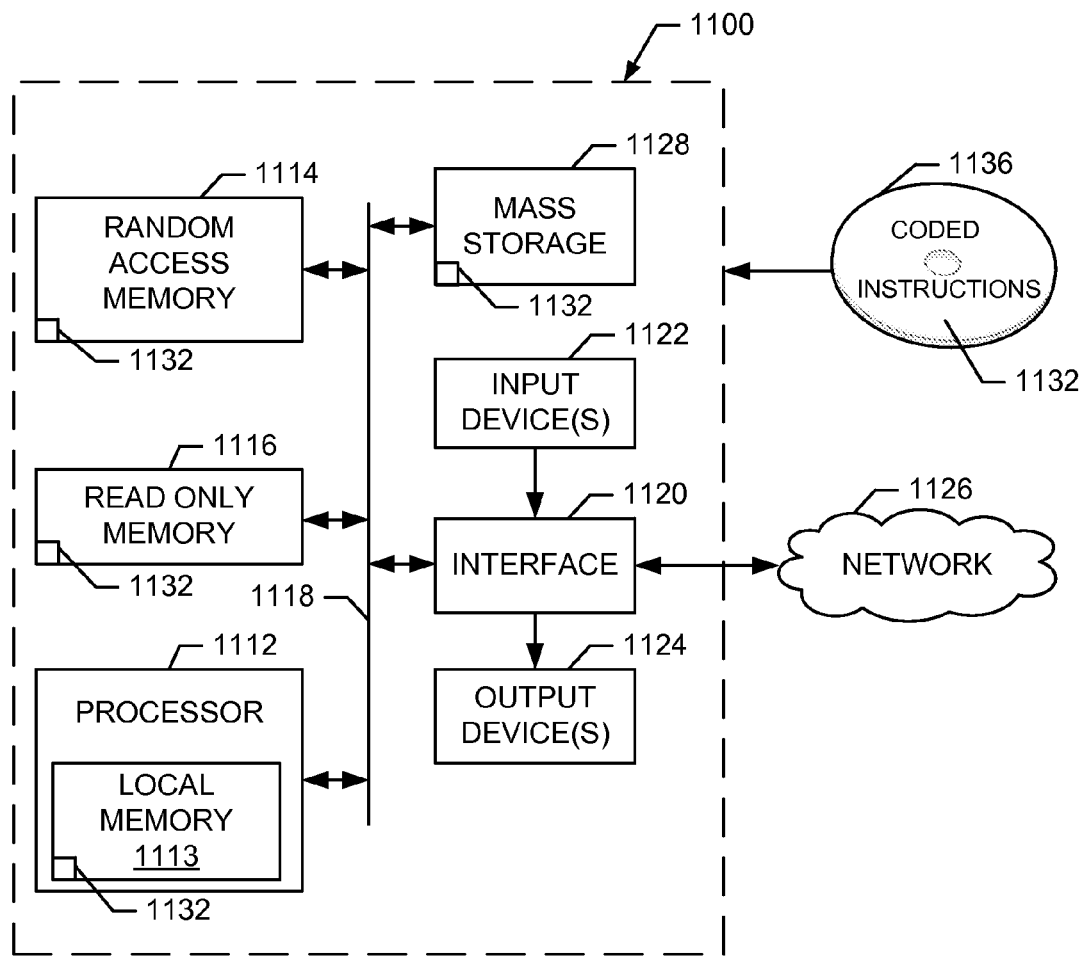
FIG. 11 is a block diagram of an example processing system that may execute the example machine readable instructions of FIGS. 6-9 and/or 10 to implement the example provider edge router of FIG. 4, the example Internet gateway router of FIG. 5 and/or the example communication network of FIG. 1.

FIG. 11 is a block diagram of an example processing system 1100 capable of executing the instructions of FIGS. 6-10 to implement the example communication network 100, the example autonomous networks 105A, 105B and/or 105C, the example PE routers 110A and/or 110C, the example border elements 115A and/or 115C, the example IGRs 120A, 120B1, 120B2 and/or 120C, the example PE router 400, the example network transceiver 405, the example QoS classifier 410, the example flowspec NLRI advertiser 415, the example routing information storage 420, the example packet filter 425, the example packet updater 430, the example routing queue(s) 435, the example IGR 500, the example network transceiver 505, the example flowspec NLRI propagator 515, the example routing information storage 520, the example packet filter 525, the example packet updater 530 and/or the example routing queue(s) 535 of FIGS. 1-5. The processing system 1100 can be, for example, a router, a gateway, a network controller, a server, a personal computer, a mobile device (e.g., a smartphone, a cell phone, etc.), an Internet appliance, or any other type of computing device.

The system 1100 of the instant example includes a processor 1112. For example, the processor 1112 can be implemented by one or more microprocessors and/or controllers from any desired family or manufacturer.

The processor 1112 includes a local memory 1113 (e.g., a cache) and is in communication with a main memory including a volatile memory 1114 and a non-volatile memory 1116 via a link 1118. The link 1518 may be implemented by a bus, one or more point-to-point connections, etc., or a combination thereof. The volatile memory 1114 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processing system 1100 also includes an interface circuit 1120. The interface circuit 1120 may be implemented by any type of interface standard, such as an Ethernet interface, a universal serial bus (USB), and/or a PCI express interface.

One or more input devices 1122 are connected to the interface circuit 1120. The input device(s) 1122 permit a user to enter data and commands into the processor 1112. The input device(s) can be implemented by, for example, a keyboard, a mouse, a touchscreen, a track-pad, a trackball, a trackbar (such as an isopoint), a voice recognition system and/or any other human-machine interface.

One or more output devices 1124 are also connected to the interface circuit 1120. The output devices 1124 can be implemented, for example, by display devices (e.g., a liquid crystal display, a cathode ray tube display (CRT)), a printer and/or speakers. The interface circuit 1120, thus, typically includes a graphics driver card.

The interface circuit 1120 also includes a communication device, such as a modem or network interface card, to facilitate exchange of data with external computers via a network 1126 (e.g., an Ethernet connection, a digital subscriber line (DSL), a telephone line, coaxial cable, a cellular telephone system, etc.).

The processing system 1100 also includes one or more mass storage devices 1128 for storing machine readable instructions and data. Examples of such mass storage devices 1128 include floppy disk drives, hard drive disks, compact disk drives and digital versatile disk (DVD) drives. In some examples, the mass storage device 1130 may implement the routing information storage 420 and/or 520. Additionally or alternatively, in some examples the volatile memory 1118 may implement the routing information storage 420 and/or 520.

Coded instructions 1132 corresponding to the instructions of FIGS. 6-10 may be stored in the mass storage device 1128, in the volatile memory 1114, in the non-volatile memory 1116, in the local memory 1113 and/or on a removable storage medium, such as a CD or DVD 1136.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method to specify quality of service for network flows, the method comprising:

receiving, via a processor, network layer reachability information including a flow specification and a first quality of service class specified for a first network flow, the network layer reachability information having been advertised by a first network element that is to receive the first network flow;

constructing a packet filter, based on the flow specification and the first quality of service class included in the network layer reachability information, to filter received packets for the first network flow according to the first quality of service class;

in response to determining an incoming packet belongs to the first network flow, updating the incoming packet by changing, via the processor and based on the packet filter, bits in the incoming packet from a first value representing the first quality of service class in a first autonomous system from which the incoming packet was received to a different, second value representing the same first quality of service class in a second autonomous system in which the incoming packet is to be routed to prepare an updated incoming packet including changed bits having the second value representing the first quality of service class, the incoming packet being received from a second network element after the network layer reachability information has been received from the first network element;

assigning the updated incoming packet including the changed bits having the second value representing the first quality of service class to a first routing queue corresponding to the first quality of service class; and routing the updated incoming packet from the first routing queue towards the first network element.

2. The method of claim 1, wherein the network layer reachability information is received in a border gateway protocol update message.

3. The method of claim 1, wherein the network layer reachability information further includes a destination prefix and a protocol type to identify the first network flow, the destination prefix representing a network address that is reachable from the first network element.

4. The method of claim 3, wherein the first network element includes a first provider edge router, and the network address represented by the destination prefix is associated with a first network border element that is reachable via the first provider edge router and servicing a first group of network endpoints that is to receive the first network flow.

5. The method of claim 4, wherein the first quality of service class is specified for the first network flow when the first network border element is homed to the first provider edge router.

6. The method of claim 1, wherein the first network element belongs to the second autonomous network, the second network element belongs to the first autonomous network, and the incoming packet is received from the second network element at a third network element belonging to the second autonomous network.

7. A tangible machine readable storage medium including machine readable instructions which, when executed, cause a machine to perform operations comprising:

accessing network layer reachability information including a flow specification and a first quality of service class specified for a first network flow, the network layer reachability information having been advertised by a first network element that is to receive the first network flow;

constructing a packet filter, based on the flow specification and the first quality of service class included in the network layer reachability information, to filter received packets for the first network flow according to the first quality of service class;

in response to determining an incoming packet belongs to the first network flow, updating the incoming packet by changing, based on the packet filter, bits in the incoming packet from a first value representing the first quality of service class in a first autonomous system from which the incoming packet was received to a different, second value representing the same first quality of service class in a second autonomous system in which the incoming packet is to be routed to prepare an updated incoming packet including changed bits having the second value representing the first quality of service class, the incoming packet being received from a second network element after the network layer reachability information has been received from the first network element;

assigning the updated incoming packet including the changed bits having the second value representing the first quality of service class to a first routing queue corresponding to the first quality of service class; and routing the updated incoming packet from the first routing queue towards the first network element.

8. The tangible machine readable storage medium of claim 7, wherein the network layer reachability information is received in a border gateway protocol update message.

9. The tangible machine readable storage medium of claim 7, wherein the network layer reachability information further includes a destination prefix and a protocol type to identify the first network flow, the destination prefix representing a network address that is reachable from the first network element.

10. The tangible machine readable storage medium of claim 9, wherein the first network element includes a first provider edge router, and the network address represented by the destination prefix is associated with a first network border element that is reachable via the first provider edge router and servicing a first group of network endpoints that is to receive the first network flow.

11. The tangible machine readable storage medium of claim 10, wherein the first quality of service class is specified for the first network flow when the first network border element is homed to the first provider edge router.

12. The tangible machine readable storage medium of claim 7, wherein the first network element belongs to the second autonomous network, the second network element belongs to the first autonomous network, and the incoming packet is received from the second network element at a third network element belonging to the second autonomous network, the first value is used to represent the first quality of service class in the third autonomous network.

13. An apparatus to specify quality of service for network flows, the apparatus comprising:

memory including machine readable instruction; and a processor to execute the instructions to perform operations including:

accessing network layer reachability information including a flow specification and a first quality of service class specified for a first network flow, the network layer reachability information having been advertised by a first network element that is to receive the first network flow;

constructing a packet filter based on the flow specification and the first quality of service class included in the network layer reachability information to filter received packets for the first network flow according to the first quality of service class;

in response to determining an incoming packet belongs to the first network flow, updating the incoming packet by changing, based on the packet filter, bits in the incoming packet from a first value representing the first quality of service class in a first autonomous system from which the incoming packet was received to a different, second value representing the same first quality of service class in a second autonomous system in which the incoming packet is to be routed to prepare an updated incoming packet including changed bits having the second value representing the first quality of service class, the incoming packet being received from a second network element after the network layer reachability information has been received from the first network element;

assigning the updated incoming packet including the changed bits having the second value representing the first quality of service class to a first routing queue corresponding to the first quality of service class; and routing the updated incoming packet from the first routing queue towards the first network element.

14. The apparatus of claim 13, wherein the network layer reachability information is received in a border gateway protocol update message.

15. The apparatus of claim 13, wherein the network layer reachability information further includes a destination prefix and a protocol type to identify the first network flow, the destination prefix representing a network address that is reachable from the first network element.

16. The apparatus of claim 15, wherein the first network element includes a first provider edge router, and the network address represented by the destination prefix is associated with a first network border element that is reachable via the first provider edge router and servicing a first group of network endpoints that is to receive the first network flow.

17. The apparatus of claim 16, wherein the first quality of service class is specified for the first network flow when the first network border element is homed to the first provider edge router.

18. The apparatus of claim 13, wherein the first network element belongs to the second autonomous network, the second network element belongs to the first autonomous network, and the apparatus is implemented by a third network element belonging to the second autonomous network.

* * * * *